United States Patent Office

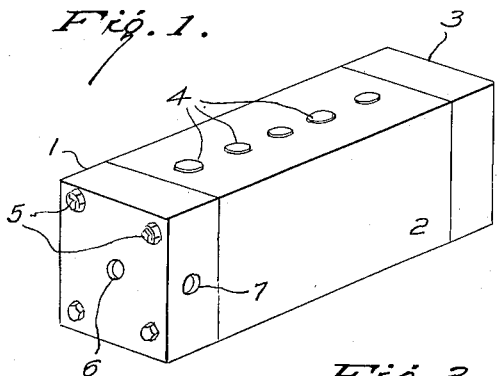
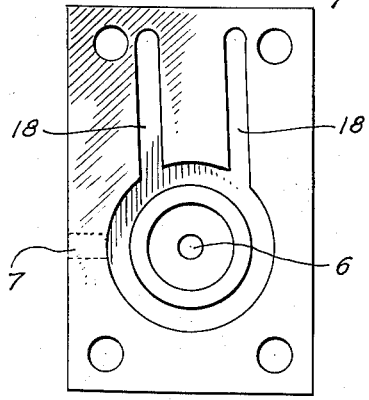
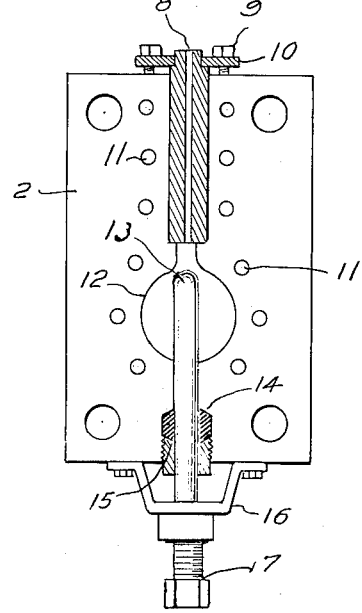
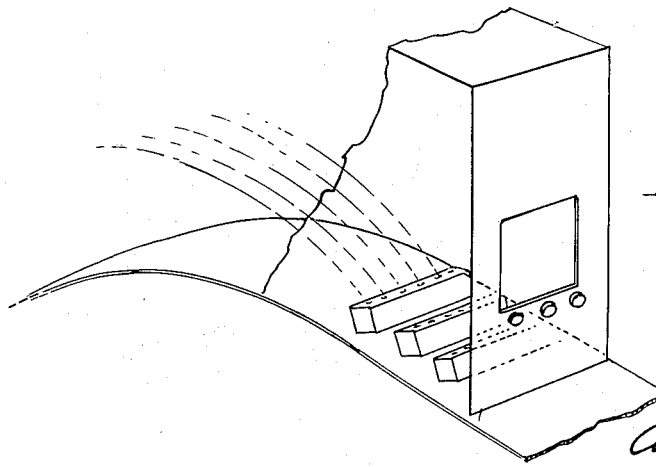
INVENTORS
MASAO MURAKAMI,
TAKEO IMAMOTO,
BY
ATTORNEY

2,746,803
Patented May 22, 1956

2,746,803

GRANULATOR

Masao Murakami and Takeo Imamoto, Otsu, Kaneko, Niihama-shi, Japan, assignors to Chemical Construction Corporation, New York, N. Y., a corporation of Delaware Application October 21, 1953, Serial No. 387,478

3 Claims. (Cl. 299—144)

This invention relates to a granulator and more particularly it relates to a granulator for granulating highly concentrated solutions of such materials as ammonium nitrate or urea and the like.

It is an object of this invention to present a granulator which can easily and efficiently turn out a granular product of good uniformity.

To this end the granulating apparatus comprises a granulator body having an inlet at one end to admit the solution to be granulated. At least one nozzle is mounted in the granulator body. Inside the granulator body is a chamber for carrying the granulating solution; this chamber communicates between the above mentioned granulating solution inlet and the above mentioned nozzle. The body also contains an inlet for a heating medium. The heating medium inlet communicates with channels which run through the body in order that the heating medium may impart its heat to the granulating solution by indirect heat exchange and thus prevent the solution from solidifying in the granulating apparatus. The channels communicate with a heating medium outlet by means of which the heating medium is passed on out of the granulating body. An additional feature of the granulating apparatus of the present invention is that a stem may protrude into the chamber which carries the granulating solution. This stem is adapted to seal off the top of the chamber from the nozzle in order that an individual nozzle may be removed from the granulating apparatus without disturbing the function of the other nozzles.

It has long been known that rotary type, or nozzle-system type, or perforated plate type granulators could be used for the granulation of chemicals such as ammonium nitrate, urea, paraform, and the like. Nevertheless these conventional granulators have been subject to certain defects. Where it is desired to increase the capacity of the nozzle-system type and the perforated plate type granulator it has been the practice to increase the spraying pressure. However this results in an increase in the time required for solidification, therefore the granulator must be built into a higher tower or the amount of cooling medium must be increased in order to have a satisfactory solidification. Furthermore, under such conditions, it becomes almost impossible to achieve uniform granulation. With the perforated plate type system, even when spraying is conducted under low pressure, the diameter of the tower must be made unreasonably large since it is impossible to control the direction of spraying.

It is also known to employ a wheel type granulator system. With this system a rotating wheel is half-dipped in the solution to be granulated. The rotating wheel splashes the granulating solution into the cooling medium and thus achieves a measure of granulation. Although the capacity of such a system is considerably larger than most, the granular distribution is undesirable. Furthermore it is difficult from an operational standpoint to keep the liquid level constant, and even if the level is kept constant by an overflowing method, the overflowing pipe must be steam jacketed. Also, since part of the solution circulates at high temperature undesirable side reactions affect the quality of granules. For example in the case of ammonium nitrate decomposition occurs and in the case of urea, the production of biuret increases.

The granulating apparatus of the present invention deals with the structure of the nozzle type granulator which can most efficiently turn out the granular product in good uniformity and in large capactiy. It eliminates the shortcomings of the conventional granulators. The quantity of granulation in a unit time by the apparatus of the present invention is large.

The conventional nozzle type granulators for granulating ammonium nitrate and urea utilize the heated and highly concentrated solution at around the melting point. The solution is sprayed into the granulation tower where it is cooled in order that solidification may occur. However the granular distribution of the product is affected by such factors as the concentration of the heated solution, the structure of the nozzle, the spraying velocity, the velocity of the cooling medium in the granulation tower, and the characteristics of the particular material to be granulated. Since the heated solution has a concentration of about 80–100% the structure of the nozzle is of the greatest importance in order to have a successful granulation.

It goes without saying that the granulation cannot be carried out efficiently if the solution is sprayed at a high pressure from a comparatively short nozzle. This is true because the heated and highly concentrated solution such as ammonium nitrate and urea has a viscosity almost equal to that of water and thus it easily turns into a fine spray. Even though the spraying is carried out at a reduced spraying pressure, thus sacrificing capacity, the sprayed particles contact one another and stick to each other. Hence sometimes they are large and sometimes they are small because of deformities introduced by the variability of the direction of the spray. The problem is made worse still when a large number of such short nozzles are set together and a solution is sprayed therethrough. The undesirable results mentioned above are greatly magnified.

However it has been found that where the nozzles have a large length compared with their inside diameter, the direction of spray can be controlled in a given direction. Therefore even if the granulating solution is sprayed from many nozzles at the same time, the above described undesirable results can be avoided and a large capacity with uniform granular products can be obtained. The length of the nozzle as against its inside diameter must be long enough so as to give a fixed direction of spray at whatever spray velocity is used, which in turn is dependent on the number of nozzles to be used and on the quantity of the solution to be treated. However, in such an elongated nozzle the granulating solution is apt to solidify and block up the nozzle even at the small temperature drop that exists between the temperature of the incoming solution and the temperature of the nozzle itself. This is true because the solution must be sprayed in the form of a heated highly concentrated solution. The nozzle is also apt to be blocked up as the result of contact between the nozzle tip and the cooling gas medium flowing up from the bottom of the granulating tower. Therefore it is desirable to prevent any temperature drop. It is also desirable to have the granulating apparatus so designed that any individual nozzle may be removed and replaced in case of stoppage. The granulator of the present invention has been designed with these desirable features in mind. The granulator can best be described with reference to the accompanying drawings in which:

Fig. 1 is a perspective assembly illustrating the granulator of the present invention;

Fig. 2 is an enlarged vertical section of Fig. 1 through the nozzle port and showing the nozzle in place;

Fig. 3 is an enlarged vertical section showing the face of the feed block that abuts the body of the granulator; and Fig. 4 shows a method of installing the granulator of the present invention in a granulation tower.

Referring to Fig. 1, the end feed block 1 abuts the granulator body 2 which is closed off by the end feed block 3. Although Fig. 1 shows five nozzle ports 4 a fewer or greater number of nozzle ports may readily be used. The two end feed blocks 1 and 3 respectively may be held to the granulator body 2 by the bolts 5 which pass through bolt holes in the feed block and body. The granulating solution inlet 6 enters one face of the end feed block 1 and the heating medium inlet 7 enters one edge of the end feed block 1.

Referring to Fig. 2, the nozzle 8 protrudes from the nozzle ports 4 shown in Fig. 1. The bolts 9 hold down the nozzle retainer 10 which in turn keeps the nozzle 8 seated. The channels 11 carry the heating medium throughout the length of the granulator body 2. The channels pass close to where the nozzle 8 is seated in the body 2. The channels 11 also surround the chamber 12. The chamber 12 carries the granulating solution; it communicates between the granulating solution inlet 6 and the nozzles 8. A stem 13 protrudes into the chamber 12. The stem 13 comes up from the bottom of the body 2 through the packing 14 and the packing follower 15. A support 16 holds the stem in position by means of screw threads. The knob 17 rotates the stem 13 which causes the stem 13 to seat or unseat itself at the top of the chamber 12. When the stem 13 is seated it can be seen that communication between the chamber 12 and the nozzle 8 is cut off. This arrangement allows the removal of any individual nozzle 8 should it become inoperable for any reason. Each nozzle has its own stem. The remaining nozzles in the body may thus still function even when one or more of the plugged nozzles has been removed.

Fig. 3 shows the inside of the end feed block 1 that abuts against the granulator body. The heating medium header 18 communicates with the heating medium inlet 7 and also with the channels 11.

The end feed block 3 may be closed off with the exception of a heating medium outlet, not shown. It should be pointed out that it is altogether possible to install two or more granulator bodies 2 in sequence before closing off the end with the end feed block 3.

Fig. 4 shows one method of installing the granulating apparatus of the present invention in a granulation tower.

An example of the operation of the granulating apparatus of the present invention as a urea granulator is shown as follows:

Conditions:
  Urea solution:
    Concentration _____ 95%.
    Temperature _____ About 120° C.
  Nozzle:
    Inside diameter _____ 1/32 inch.
    Length _____ 4 inches.
    Injection angle _____ 60°.
    Injection pressure _____ 4.2 kg./cm.$^2$.
  Cooling air:
    44 m.$^3$/min. _____ At 15.6° C., 50% humidity.
Granular distribution:
  Over 2.47 mm. diameter _____ 0.5%.
  2.47–1.41 mm. diameter _____ 76.6%.
  1.41–1.13 mm. diameter _____ 19.0%.
  Under 1.13 mm. diameter _____ 3.9%.

As shown by the granular distribution listed above granules having over 1 mm. diameter occupy 98.5% of the total volume, thus showing the excellence of the granular distribution obtained by the granulating apparatus of the present invention.

Each individual nozzle used in the above example has a capacity of 0.5 ton/day.

We claim:

1. In an apparatus for preparing discrete granules in which hot concentrated solution is forced through a plurality of openings into a large, cooled drying chamber, an improved discharge-nozzle assembly which comprises: a horizontally-elongated block having a central solution passage along the horizontal axis of said block and an end port means for admission of hot solution thereinto; said block also having: a plurality of parallel discharge ports extending generally upwardly and at substantially right angles thereto from said central passage to an outer face on said block; in each of said discharge ports an elongated nozzle element demountably fastened therein and substantially filling said port, said nozzle element being of sufficient length relative to a small central lengthwise passage therethrough to impart definite direction to solution discharged from the exit end; a plurality of borings lengthwise through the block parallel to said central passage and located about said central passage and said discharge ports but connected with neither; and header means at either end of said block for circulating heating fluid through said borings.

2. The apparatus according to claim 1 in which for each discharge port in said block there is a valve port substantially aligned therewith and extending from the central passage through the block and out through the opposite face and each valve port has therein a stem substantially filling said valve port and held therein by a liquid-tight sealing means and mounted for movement along said valve port, said stem being sufficiently long when fully inserted to pass across the central passage and close the entrance from the central passage into the corresponding port, whereby the nozzle element may be removed from the so-closed discharge port without solution loss.

3. The apparatus according to claim 2 in which said stem is provided with screw means for mechanically adjusting the setting of said stem.

References Cited in the file of this patent

UNITED STATES PATENTS

| | | |
|---|---|---|
| 565,986 | Hogan | Aug. 18, 1896 |
| 2,110,882 | Knox | Mar. 15, 1938 |
| 2,561,393 | Marshall | July 24, 1951 |
| 2,657,097 | New | Oct. 27, 1953 |
| 2,658,796 | Kopperschmidt | Nov. 10, 1953 |